Figure 4:
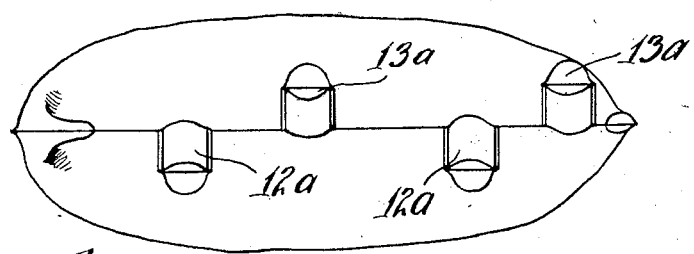

April 19, 1927.
J. SCHAEFER
1,625,398
METHOD OF AND APPARATUS FOR MAKING HOLLOW RUBBER ARTICLES
Filed April 16, 1923   3 Sheets-Sheet 1
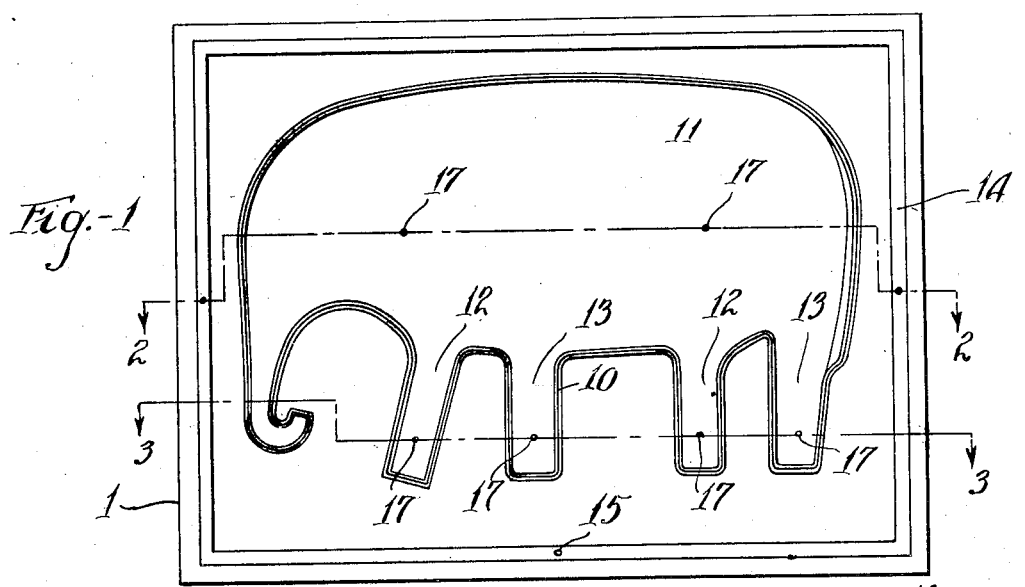
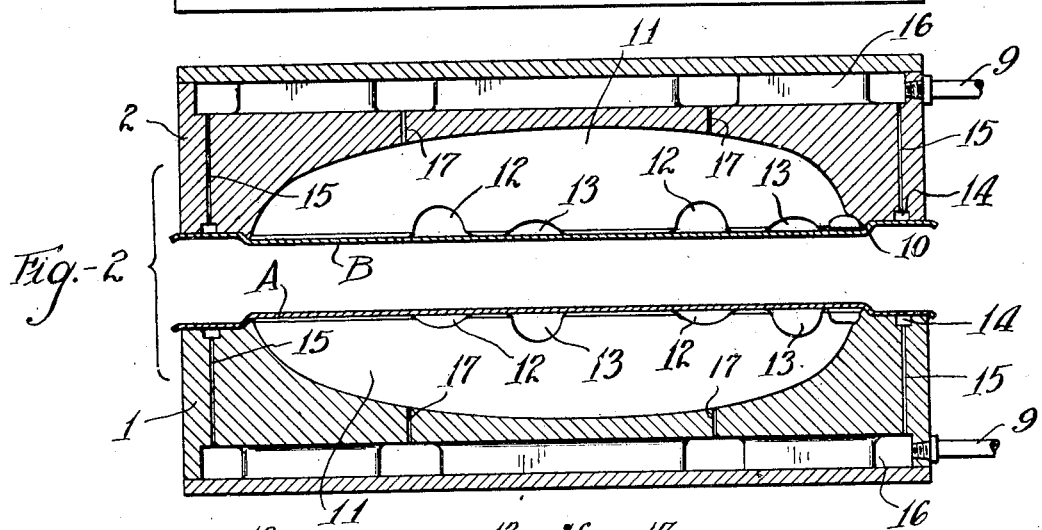
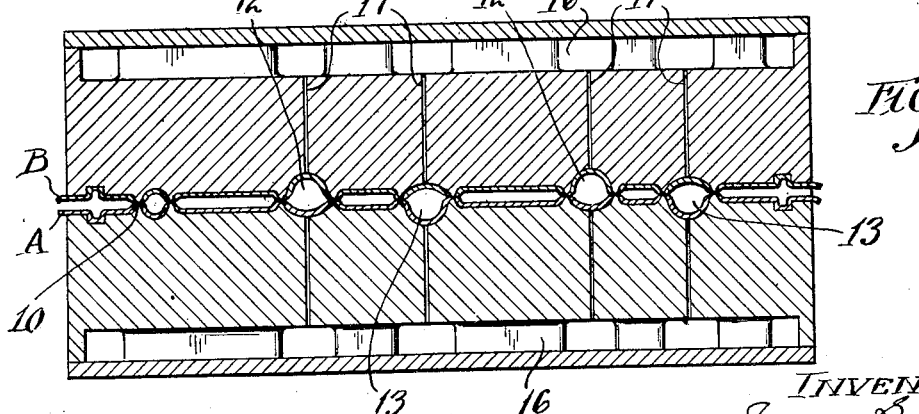

April 19, 1927.  1,625,398
J. SCHAEFER
METHOD OF AND APPARATUS FOR MAKING HOLLOW RUBBER ARTICLES
Filed April 16, 1923   3 Sheets-Sheet 2

INVENTOR
James Schaefer
BY Baker & Macklin
ATTYS.

April 19, 1927. 1,625,398
J. SCHAEFER
METHOD OF AND APPARATUS FOR MAKING HOLLOW RUBBER ARTICLES
Filed April 16, 1923   3 Sheets-Sheet 3
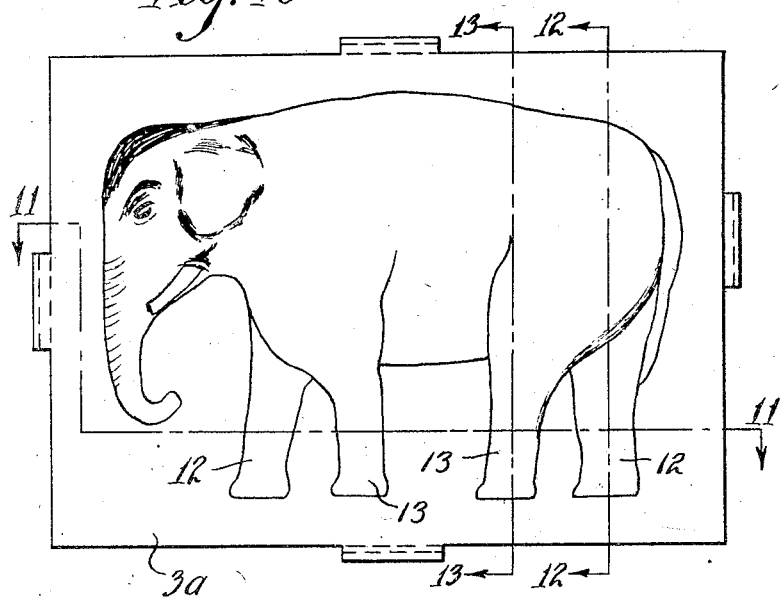
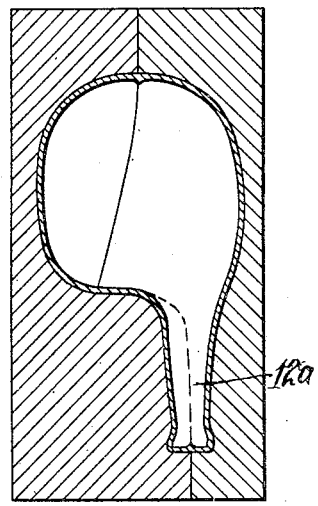
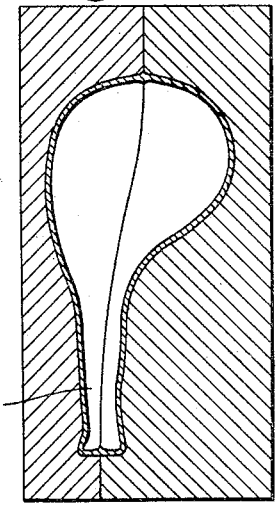
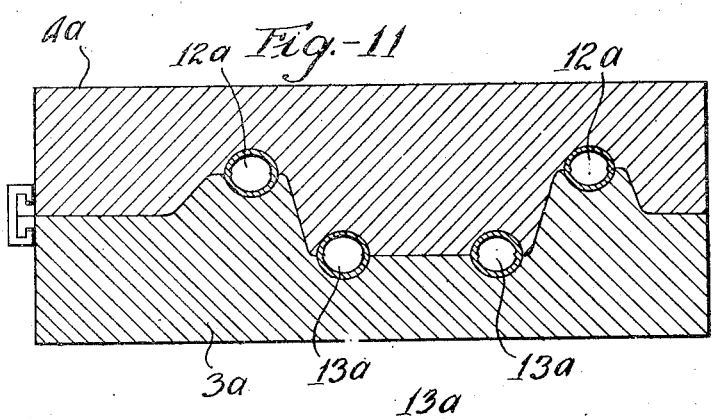
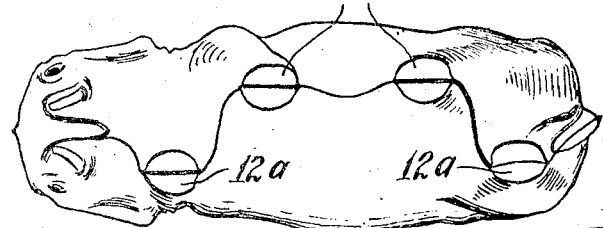
INVENTOR
James Schaefer,
BY Bates & Macklin,
ATTYS.

Patented Apr. 19, 1927.

1,625,398

UNITED STATES PATENT OFFICE.

JAMES SCHAEFER, OF WEST PATERSON, NEW JERSEY, ASSIGNOR TO PARAMOUNT RUBBER CONSOLIDATED, INC., OF LITTLE FALLS, NEW JERSEY, A CORPORATION OF DELAWARE.

METHOD OF AND APPARATUS FOR MAKING HOLLOW RUBBER ARTICLES.

Application filed April 16, 1923. Serial No. 632,231.

This invention relates to a method of and apparatus for making hollow rubber articles having certain portions or regions thereof offset from other portions or regions, such as rubber toy animals and similar objects.

In making rubber toy objects, for instance, animals where there are legs off-set from a plane passing through the mid-portion of the animal, the usual practice heretofore has been to form the opposing halves and then to cement the halves prior to vulcanization. One of the difficulties of joining two halves of a rubber toy animal in the vulcanizing process has been due to the fact that the body has usually been died out between male and female dies and semicured to hold its shape until vulcanized, and the semicuring interferes with satisfactorily securing the parts together. The operation is comparatively slow and expensive. Moreover the expense of matching male and female dies is considerable.

The object of my invention is to provide for pneumatically forming hollow rubber objects, of the character set forth, so as to eliminate the necessity for pressing the halves between male and female dies, and to enable economical and rapid operation.

I carry out the above object by using a forming mold so distorted that the different cavities therein terminate in one plane, so that sheets of raw rubber may be laid across the mold and pneumatically forced into the cavities and have their seams lying in the same plane; then the biscuit is transferred to a vulcanizing mold, the cavities of which are formed and positioned according to the final object to be produced. With such a forming mold, I can surround each complete cavity by a raised cutting edge adapted to form an effective seam by mechanical pressure and also to cut off the surplus stock of raw material.

Another feature of the invention comprises making cooperating cavities in the two sections of the forming mold of different depth, whereby the rubber occupying one cavity is stretched to a greater degree than that occupying the cooperating cavity, and thus the normal tendency of the rubber to contract will deflect the portion formed by these cooperating cavities and enable it to be more readily positioned in the vulcanizing mold. For example, in the manufacture of rubber toy animals, the cavities employed for the formation of the legs may be of greater volume or depth in one section of the mold than in the cooperating section, whereby the rubber occupying the leg forming cavities is necessarily stretched more on one side than on the opposite side. As a result, the legs flare in the desired direction when the biscuit is removed from the mold, and this enables a biscuit to occupy the cavities in the vulcanizing mold without undue distortion.

An apparatus for carrying out the above method is illustrated in the drawings and set forth in the following description. My invention includes both the method and apparatus, and its essential features will be summarized in the claims.

Figure 5:
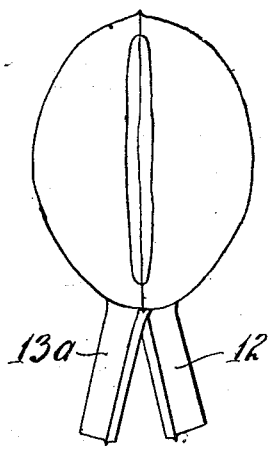
Figure 7:
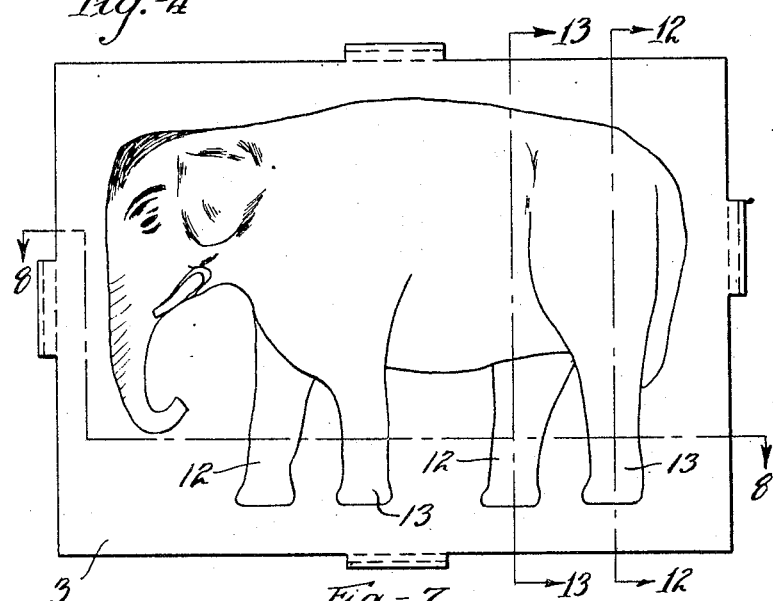
Figure 6:
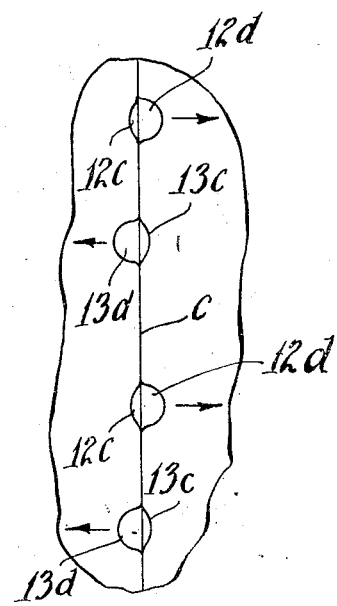
Figure 8:
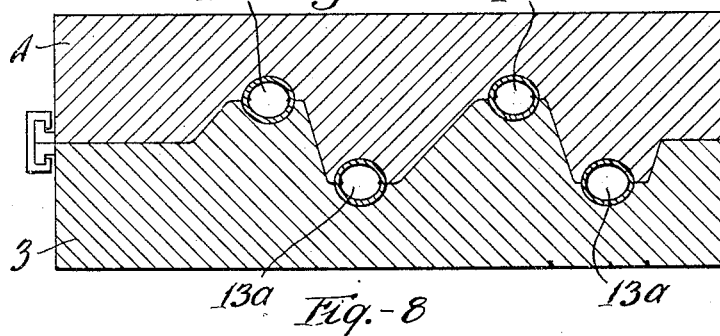
Figure 9:
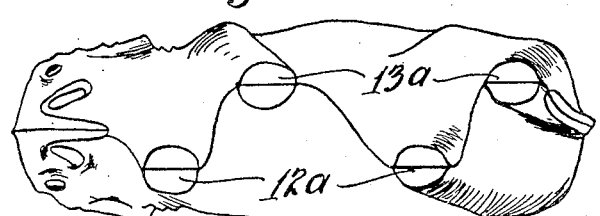

In the drawings, Fig. 1 is a plan view of a forming mold having cavities therein for the formation of an article representing a toy elephant; Fig. 2 is a section through the forming mold showing the cooperating sections placed above each other and also showing the sheets of raw rubber stock across the faces of the sections; Fig. 3 is a section through the mold with the sections in proper juxtaposition for molding purposes; Fig. 4 is a bottom view of the biscuit; Fig. 5 is an end view of the biscuit shown in Fig. 4; Fig. 6 is a diagram showing the relative proportions of depth in the cooperating cavities of the forming mold to effect the flare of the legs in the biscuit; Fig. 7 is a plan view of the vulcanizing mold having the upper half removed and showing the biscuit in place; Fig. 8 is a section taken on the line 8—8 in Fig. 7; Fig. 9 is a bottom view of the completed article; Fig. 10 is a plan view of the vulcanizing mold having the upper section removed and showing a modified form of article to be molded therein; Fig. 11 is a section taken on the lines 11—11 in Fig. 10; Figs. 12 and 13 are sections taken on the correspondingly numbered lines in Figs. 7 and 10 respectively (looking rearward in Fig. 7 and forward in Fig. 10); and Fig. 14 is a bottom view of the object obtained from the vulcanizing mold shown in Fig. 10 and comprising a modification of the object shown in Fig. 9.

My invention as heretofore stated embodies a method of pneumatically forming hollow rubber articles which have the seams of certain portions thereof lying in different planes. I have illustrated my invention in the formation of a toy animal wherein the legs on one side have the seams thereof lying in one plane while the legs on the other side have the seams thereof lying in another plane. The various steps in the manufacture of this toy article comprises the formation of a peculiar biscuit in the forming mold, then the transferring of the biscuit to a differently shaped vulcanizing mold against the wall of which the biscuit is forced by internal pressure. The step of forming the biscuit will now be described.

In Fig. 1, I have illustrated the lower section of a forming mold having a major cavity 11 therein to form the body of an article, and having minor cavities 12 and 13 to form the legs of the animal represented by the completed article, and around the entire cavity extends a raised cutting edge 10. Each section may be provided with an endless groove 14 spaced inwardly from the marginal edges of the section, and with passageways 15, which lead to a vacuum chamber 16 in the base of the section. Suitable passageways 17 provide communication between the vacuum chamber and the forming cavities as shown particularly in Figs. 2 and 3. The top section is similar in construction to the bottom section so far as the major cavity and vacuum groove is concerned, so that each section forms one-half the body of the article to be formed. The conduits 9 may be connected to a suitable vacuum pump (not shown) for exhausting the air in the vacuum chamber and thereby to draw the raw rubber stock into the cavities.

The arrangement of the minor cavities in the cooperating sections is designed to cause the portions of the article formed in the minor cavities to be flared when the biscuit is removed from the forming mold. To obtain this result, the minor cavity in one section is larger than the cooperating minor cavity in the other section as shown particularly in Figs. 2 and 3. Thus, the cavities 12 are larger in the top section than the cavities 13, while in the lower section, the cavities 13 are larger than the cavities 12. Accordingly, when sheets of raw rubber stock A and B are placed across the sections 1 and 2 of the forming mold, and the atmospheric pressure in the chambers 16 is reduced so as to cause the sheets of rubber to conform to the cavities in the sections, then the rubber in the cavities 12 on the lower section is not stretched as much as the rubber in the cooperating cavities 12 in the upper section. Similarly, the rubber in the top section which occupies the cavities 13 is not stretched as much as the rubber which occupies the cavities 13 in the lower section.

It results from this method of formation that when the biscuit is removed from the forming mold, the natural tendency for the rubber is to assume the original position which causes the legs $12^a$ and $13^a$ to flare in opposite directions so that the seams of the rubber which comprise the leg portions, are moved out of the general plane passing through the meeting edges of the body portion. Accordingly, when the biscuit is placed in the vulcanizing mold, the legs partially occupy the minor cavities wherefore the vulcanized article is formed without distortion of the rubber adjacent the region of connection between the body portion and leg portions.

In Fig. 6, I have shown graphically a diagram illustrating the arrangement of cooperating cavities to cause the mid-plane through the leg portions to deviate from the mid-plane of the body portion when the biscuit is removed from the forming mold. In this diagram, the line C indicates the mid-plane passing through the body portion while the curved lines $12^c$ and $13^c$, respectively, indicate the rubber occupying the small minor cavities, while the curved lines $12^d$ and $13^d$ indicate the stretched rubber which occupies the large minor cavities. The arrows then indicate the direction in which the rubber occupying the minor cavities is flared when the biscuit is removed from the mold.

The next step in the formation of a hollow rubber article having the characteristics above set forth is the transferring of the biscuit to a vulcanizing mold. In Fig. 7, I have shown the lower section 3 of a vulcanizing mold with the biscuit in place, while in Fig. 8 I have shown the two sections 3 and 4 in proper juxtaposition for the vulcanizing operation. In this last figure, the leg portions are shown as being offset from the mid-plane of the body portion wherefore the completed articles as indicated in Fig. 9 represents a toy animal standing in natural position. During the vulcanization, the rubber is held against the walls of the vulcanizing mold due to the internal pressure resulting from the usual expansible substance in the biscuit during the forming operation. The offset relationship of the minor cavity to the major cavity in the vulcanizing mold is shown more clearly in Figs. 12 and 13 which represent sections in the correspondingly numbered lines in Figs. 7 and 10 respectively, looking in the directions indicated by the arrows.

From the foregoing description, it will be seen that my invention is well adapted for the formation pneumatically from sheet stock of hollow rubber articles representing toy animals, wherein the planes passing through the leg portions are not the same as the planes passing through the seam of the body portion. It will further be seen that hollow rubber articles having these characteristics may thus be made with only forming and vulcanizing operations, that the cost is greatly reduced over the old dieing process, and the speed of production greatly increased.

Having thus described my invention, I claim:—

1. The method of forming hollow rubber articles comprising bringing together two parts with the meeting edges thereof lying in a single plane and then vulcanizing the parts with the meeting edges lying in a plurality of plane.

2. The method of forming hollow rubber articles comprising the seating of stock in two mold cavities each surrounded by a cutting edge lying in one plane, bringing such mold cavities together to join the parts and shear off the surplus stock, and vulcanizing the biscuit with its meeting edges in a plurality of planes.

3. The method of forming hollow rubber articles comprising pneumatically seating rubber stock in forming molds with the abutting edges of the stock in one plane and thereafter vulcanizing the article with the abutting edges of one portion in one plane and the abutting edges of another portion in another plane.

4. The method of forming hollow rubber articles comprising pneumatically seating raw rubber stock in forming molds each having a cavity surrounded by a cutting edge terminating in one plane, and then vulcanizing the article with the abutting edges of one portion in one plane, and the abutting edges of another portion in another plane.

5. The method of making hollow articles of sheet rubber comprising placing sheet stock across the mouths of mold cavities having their edges in a plane, seating such stock by suction applied to the cavities, joining the seated stock, removing it from the forming mold and finally vulcanizing it with its meeting edges in a plurality of planes.

6. The method of forming hollow rubber articles comprising seating rubber stock in a forming mold having major and minor cavities so arranged that the abutting edges lie in one plane, and then vulcanizing the article so that the portions formed in the minor cavities have their meeting edges in a plane different from that passing through the abutting edges of the parts formed in the major cavities.

7. The method of forming hollow rubber articles comprising pneumatically seating sheet rubber stock in a forming mold in major and minor cavities so arranged that all the abutting edges lie in one plane and then vulcanizing the article so that the portions formed in the minor cavities have their meeting edges in a plane different from that passing through the abutting edges of the parts formed in the major cavities.

8. An apparatus for forming hollow rubber articles comprising a forming mold, one of the cavities in one section of the forming mold having greater volume than the cooperating cavities in the other section of the forming mold, wherefore the rubber occupying the deeper of such cavities is stretched more than the rubber occupying the cooperating cavity, therefor, and a vulcanizing mold having cavities of similar depth in the two mold sections.

9. The apparatus for forming hollow rubber articles comprising means for pneumatically seating sheet rubber stock in major and minor cavities in a forming mold, the minor cavities in one section of the forming mold having greater volume than the cooperating minor cavity in the other section of the forming mold wherefore the rubber occupying the deeper minor cavity is stretched more than the rubber occupying the cooperating cavity.

10. The apparatus for forming hollow rubber articles having the junction of one portion lying in one plane, and the junction of another portion lying in another plane, comprising means for pneumatically seating rubber stock in a forming mold having cavities therein, the cavities in one section having greater volume than the cooperating cavities in the other section, wherefore the rubber occupying the deeper cavity is stretched more than the rubber occupying the cooperating cavities so that the normal tendency of the stretched rubber to contract causes the plane passing through the junction of such portion to deviate from a plane passing through the junction of another portion.

11. The apparatus for forming hollow rubber articles having the seams of one portion lying in one plane and the seams of another portion lying in another plane comprising means for seating the raw rubber sheet stock by suction in a forming mold having cavities therein, surrounded by a cutting edge terminating in one plane, the cavities in one section having greater volume than the cooperating cavities in the other section, wherefore the rubber occupying the deeper cavity is stretched more than the rubber occupying the cooperating cavities so that the normal tendency of the stretched rubber to contract causes the plane passing through the seam of such portion to deviate from a plane passing through the seam of another portion.

12. The apparatus for forming hollow rubber articles comprising means for seating rubber stock in forming molds having communicating cavities, one pair of cooperating cavities being of substantially equal size in the two mold sections and another pair of cooperating cavities being of unequal size in the two mold sections, wherefore a portion of the article formed by the rubber stock has unequal volumes on opposite sides of the plane passing through the abutting edges of said stock and a cooperating vulcanizing mold having substantially equal coacting cavities.

13. In an apparatus for forming hollow rubber articles the combination of means for pneumatically seating raw rubber stock in forming molds having major and minor cavities, the major cavities being of substantially equal size in the cooperating mold sections, and the minor cavities being of unequal size in the cooperating mold sections, wherefore the article formed by the rubber stock has unequal volumes on opposite sides of a plane passing through the abutting edges of said stock and a cooperating vulcanizing mold.

14. In an apparatus for making hollow rubber articles, a forming mold having major and minor cavities in the cooperating mold sections, the cavities being of such depth that the rubber occupying the major cavities is stretched substantially equally in the cooperating mold sections, while the rubber occupying the minor cavities is stretched unequally in the cooperating mold sections.

15. An apparatus for use in the method of making hollow rubber articles comprising means for seating sheet rubber stock by suction in a forming mold having major and minor cavities in the cooperating mold sections, the cavities being of such depth that the rubber occupying the major cavities is stretched equally in the cooperating mold sections, while the rubber occupying the minor cavities is stretched unequally in the cooperating mold sections wherefore the portions formed in the minor cavities are flared when the biscuit is removed from the forming mold.

16. An apparatus for making hollow rubber articles comprising means for seating of raw rubber stock in cooperating sections of forming molds, said sections having major and minor cavities so formed that the rubber occupying the major cavities is stretched substantially equally in the cooperating sections while the rubber occupying the minor cavities is stretched unequally in the cooperating sections wherefore the portions of the article formed therein are flared in opposite directions when the biscuit is removed from the mold, and a cooperating vulcanizing mold wherein the minor sections are placed in cavities offset from the general meeting plane in the direction of the flare.

17. An apparatus for making hollow rubber articles comprising a forming mold having its meeting faces in one plane and a cooperating vulcanizing mold having its meeting faces in different planes.

18. An apparatus for making hollow rubber articles comprising a forming mold having its cavities surrounded by cutting edges terminating in a plane and a cooperating vulcanizing mold having the meeting faces of its corresponding cavities in different planes.

19. An apparatus for making hollow rubber articles comprising the combination of a forming mold having its cavities surrounded by a cutting edge terminating in a plane, means for exhausting air from each cavity, and a vulcanizing mold having an offset meeting face and having its cavities approximately corresponding to those of the forming mold but differently positioned therefrom.

20. An apparatus for forming hollow rubber articles comprising a pair of forming mold sections having major and minor cavities therein, but the meeting edges of all of said cavities lying in the same plane, and a cooperating vulcanizing mold having the meeting edges of the major cavities in one plane and those of the minor cavities in other planes.

21. An apparatus for forming hollow rubber articles comprising a pair of mold sections having major cavities and minor cavities, the cooperating major cavities being of substantially equal size and the cooperating minor cavities being of unequal size.

22. An apparatus for forming hollow rubber articles comprising a pair of forming mold sections having major and minor cavities therein, the cooperating major cavities in said sections being of substantially equal size and the cooperating minor cavities in said sections being of unequal size, the meeting edges of all of said cavities lying in the same plane and comprising a raised cutting edge.

23. The method of forming hollow rubber articles comprising taking two sheets of rubber, outwardly bulging them in certain regions, one pair of cooperating bulges being substantially equal and another pair being unequal in the respective sheets, and then joining the sheets together by a continuous seam extending about the equal and unequal bulges successively.

24. The method of forming hollow rubber articles comprising pneumatically seating two sheets of rubber in such manner that in one region the rubber is stretched differently in one mold member from the other while in another region the relative stretching in the two mold members is more nearly identical.

25. The method of forming hollow rubber articles comprising pneumatically seating two sheets of rubber in such manner that in one region the ratio of stretching of the rubber in the opposed parts is different from the ratio of stretching of the rubber in the opposed parts in another region.

26. The method of making hollow rubber articles having a plurality of legs comprising forming the body of a biscuit with the rubber stretched substantially equally in opposite directions and the legs with unequal stretching, whereby the legs tend to flare in the direction of the greater stretching, and then vulcanizing the body and legs as a unit.

27. The method of making hollow rubber articles having a plurality of legs comprising forming the biscuit in such manner that the legs flare apart and then vulcanizing the article in a manner which maintains the legs substantially parallel.

In testimony whereof, I hereunto affix my signature.

JAMES SCHAEFER.